US006413891B1

(12) United States Patent
Cho et al.

(10) Patent No.: US 6,413,891 B1
(45) Date of Patent: Jul. 2, 2002

(54) GLASS MATERIAL SUITABLE FOR A WAVEGUIDE OF AN OPTICAL AMPLIFIER

(75) Inventors: Doo-Hee Cho; Yong-Gyu Choi; Kyong-Hon Kim, all of Taejon (KR)

(73) Assignee: Electronics and Telecommunications Research Institute (KR)

(*) Notice: Subject to any disclaimer, the term of this patent is extended or adjusted under 35 U.S.C. 154(b) by 0 days.

(21) Appl. No.: 09/689,394

(22) Filed: Oct. 11, 2000

(30) Foreign Application Priority Data

Oct. 11, 1999 (KR) .............................. 99-43722

(51) Int. Cl.[7] .............................. C03C 3/12; C03C 3/23; C03C 3/253; H01S 3/17; H01S 3/067

(52) U.S. Cl. .............................. 501/41; 501/37; 501/42; 501/43; 359/341; 359/343; 372/6; 372/40

(58) Field of Search .............................. 501/37, 41, 42, 501/43; 359/341, 343; 372/6, 40

(56) References Cited

U.S. PATENT DOCUMENTS

| 3,883,357 A | * | 5/1975 | Cooley | |
| 4,652,536 A | * | 3/1987 | Nakajima et al. | .............. 501/41 |
| 5,093,288 A | * | 3/1992 | Aitken et al. | ................. 501/42 |
| 5,251,062 A | | 10/1993 | Snitzer et al. | ................. 359/341 |
| 5,798,306 A | | 8/1998 | Dickinson, Jr. | .............. 501/57 |
| 6,194,334 B1 | * | 2/2001 | Aitken et al. | ................. 501/41 |

FOREIGN PATENT DOCUMENTS

| EP | 858 976 A | * | 8/1998 |
| JP | 62-288135 | * | 12/1987 |
| JP | 08-110535 A | * | 4/1996 |
| JP | 11-125725 A | * | 5/1999 |
| JP | 11-228182 A | * | 8/1999 |

OTHER PUBLICATIONS

Lewis, Sr., Hawley's Condensed Chemical Dictionary, p. 587, 1993.*
Wang et al. *Optical Materials*, "Tellurite glass: a new candidate for fiber devices", 3, (Aug. 1994), pp. 187–203.
Sidebottom et al. *Journal of Non–crystalline Solids*, "Structure and optical properties of rate earth–doped zinc oxyhalide tellurity glasses", 222, (1997), pp. 282–289.
Wang et al. *Journal of Non–Crystalline Solids*, "Raman Spectra and Thermal Analysis of a New Lead–Tellurium–Germanate Glass System", 210, (1997) p. 130–135.

* cited by examiner

*Primary Examiner*—David Sample
(74) *Attorney, Agent, or Firm*—Blakely Sokoloff Taylor & Zafman

(57) ABSTRACT

Glasses of the present invention are tellurite and oxyhalide glasses doped with rare-earth ion, which can be applied to highly efficient optical amplifiers and lasers for optical communication. They are thermally and chemically stable during and after the fabrication processes of the optical fiber. The glass material includes 20~70 mole % of $TeO_2$, a heavy metal oxide, 0.001~10 mole % of a rare earth ion dopant, 5~30 mole % of MO, M being selected from a group consisting of Mg, Ca, Sr, Ba, Zn and Pb, and optionally 1~20 mole % of $R_2O$, R being selected from a group consisting of Li, Na, K, Rb and Cs. In the composition of the glass, 3~18 mole % of MO and $R_2O$ may be substituted by the metal halides. The glasses of the present invention are similar in phonon energy to the conventional tellurite glasses not to increase the non-radiative transition rate. Further, the fluorescence lifetime is additionally increased in case of partial substitution of oxide to halide.

11 Claims, 4 Drawing Sheets

GLASS MATERIAL SUITABLE FOR A WAVEGUIDE OF AN OPTICAL AMPLIFIER

FIELD OF THE INVENTION

The present invention relates to a glass; and more particularly to a glass doped with rare earth ions for use in an optical amplifier.

Description of the Prior Art

A silicate glass based on a quartz glass is dominantly used as a host glass of a gain medium fiber in optical amplifiers for optical communication. It has excellent properties on facilities of fiber fabrication, chemical stability and optical transparency. However, the fluorescence of silicate glass suffers from its high phonon energy in many cases. The transition with energy gap less than 4,500 $cm^{-1}$ is not capable of effectively performing laser oscillation or optical amplification in the silicate glass.

In order to overcome the above problems, a special glass, e.g., a fluoride or a chalcogenide glass, having low phonon energy has been proposed. However, the special glass still has some problems such as thermal stability, chemical durability, resistance to humidity.

Recently, there has been considerable attention paid to a tellurite glass which has phonon energy (600~800 $cm^{-1}$) higher than those of the fluoride (400~500 $cm^{-1}$) and the chalcogenide (300~400 $cm^{-1}$) glasses, but lower than that of the silicate glass (1,100 $cm^{-1}$). Therefore, the tellurite glass can suppress non-radiative transition through multi-phonon relaxation in the transition with energy gap of 3,500 $cm^{-1}$ or more. The tellurite glass has larger absorption and emission cross-sections than those of the silicate glass and the fluoride glass, thereby obtaining relatively strong fluorescence. Further, the tellurite glass has higher thermal stability, chemical durability and resistance to humidity than those of the fluoride and the chalcogenide glasses, thereby being expected to have relatively higher reliability when used in optical communication system.

U.S. Pat. No. 5,251,062 discloses a tellurite glass with a composition of: 58~84 mole % of $TeO_2$, 0~24 mole % of $Na_2O$ and 10~30 mole % of ZnO. The tellurite glass may be applicable to an optical amplifier or a solid laser oscillator utilizing an optical fiber or other optical waveguide structures. The tellurite glass has several advantages as follows: it easily give a different refractive index to a core and a cladding; and to draw a preform made of the tellurite glass into an optical fiber with ease, while $TeO_2$—ZnO—$Li_2O$ glasses proposed in the prior patent document (U.S. Pat. No. 3,836,871) are of compositions inapplicable to the optical fiber. U.S. Pat. No. 5,798,306 discloses rare-earth ion doped oxyhalide glass for laser, which comprises the substitution of fluorine for oxygen in the glass having a representative composition of 50 mole % of $SiO_2$, 25 mole % of CaO and 25 mole % of $Al_2O_3$. When $Er_2O_3$ can be doped with amounts of 0.01 mole % to 1.2 mole % (500 ppm ~5.68% by weight) into this glass. There is not concentration quenching in fluorescence. The fluorescence lifetime is longer in the fluorine-substituted glass than that of the pure oxide glass when same amounts of $Er_2O_3$ are doped into both glasses.

U.S. Pat. No. 4,652,536 discloses glasses, which comprise 60~85 mole % of $TeO_2$, 0~25 mole % of $Li_2O$, 0~35 mole % of $Na_2O$, 0~25 mole % of $K_2O$, 0~25 mole % of $Rb_2O$, 0~15 mole % of $Cs_2O$, 0~10 mole % of MgO, 0~5 mole % of CaO, 0~5 mole % of SrO, 1~30 mole % of BaO, 0~30 mole % of ZnO, 0~30 mole % of PbO, and 0~5 mole % of $La_2O_3+ZrO_2+TiO_2+Nb_2O_5+Ta_2O_5+WO_3$, wherein the amount of $K_2O+Rb_2O+Cs_2O$ is limited to 1~25 mole %, and the amount of ZnO+PbO is limited to 1~30 mole %. These glasses have lower light path difference with temperature change and enhanced figure of merit for acoustic optical devices than those of the prior glasses. These glasses may be used in acoustic optical devices such as light modulator and light path conversion devices, and can be also used as a glass with high refractive index or a glass with low melting point.

There have been other research results for tellurite glasses (See, J. S. Wang, E. M. Vogel and E. Snitzer, "Tellurite Glass: A New Candidate for Fiber Devices", Optical materials, 3, 187–203(1994), D. L. Sidebottom, M. A. Hruschka, B. G. Potter and R. K. Brow, "Structure and Optical Properties of Rare-Earth-Doped Zinc Oxyhalide Glasses", J. of Non-cryst. Solids, 222, 282–289(1997), Zhengda pan and Steven H. Morgan, "Raman Spectra and Thermal Analysis of A New Lead-Tellurium-Germanate Glass System" J. of Non-Cryst. Solids, 210, 130–135 (1997)).

However, the tellurite glass still has a problem of being easily crystallized when heated up to a crystallization temperature, that is, between the glass transition temperature and the melting temperature. This problem may result in cutting off the optical fiber during the fiber drawing process. It may also largely increase an optical loss due to fine crystals within the optical fiber.

Therefore, there would be needed to solve the above-mentioned problem in the crystallization of the tellurite glass and to provide the tellurite glass with enhanced optical properties for light waveguide type optical amplifiers.

SUMMARY OF THE INVENTION

It is an object of the present invention to provide a glass composition applicable to a gain medium glass for rare-earth ions doped light waveguide type amplifiers.

It is also another object of the present invention to provide a tellurite glass, which is hardly crystallized or phase-separated during the fabrication of an optical fiber, thereby being stable thermally and chemically.

In accordance with one aspect of the present invention, there are provided a glass material suitable for a waveguide of an optical amplifier, comprising: 20~70 mole % of $TeO_2$; 1~30 mole % of $In_2O_3$ or a combination of $GeO_2$ and $In_2O_3$ oxide; 0.001~10 mole % of a rare earth ion dopant; 5~30 mole % of MO, M being a material selected from a group consisting of Mg, Ca, Sr, Ba, Zn and Pb; and optionally 1~20 mole % of $R_2O$, R being a material selected from a group consisting of Li, Na, K, Rb and Cs.

In accordance with another aspect of the present invention, there are provided a glass material suitable for optical waveguide type amplifier, comprising: 20~70 mole % of $TeO_2$; a heavy metal oxide; 0.001~10 mole % of a rare earth ion dopant; 5~30 mole % of MO, M being a material selected from a group consisting of Mg, Ca, Sr, Ba, Zn and Pb; optionally 1~20 mole % of $R_2O$, R being a material selected from a group consisting of Li, Na, K, Rb and Cs; and 3~18 mole % of the metal oxide of MO or/and $R_2O$ is substituted by metal halide(s).

DETAILED DESCRIPTION OF THE PREFERRED EMBODIMENTS

Figure 2:
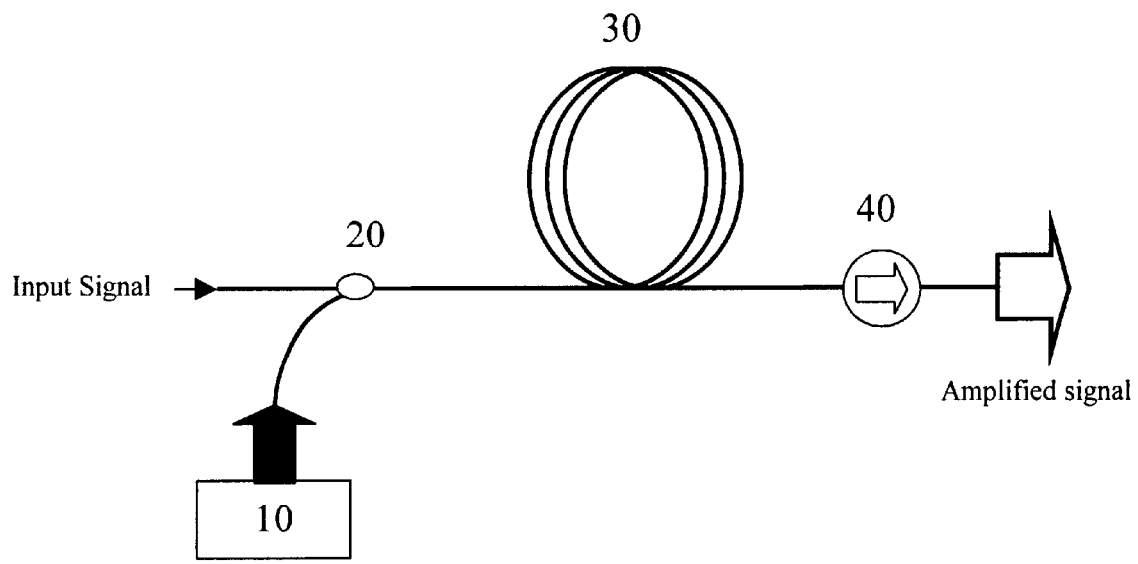
FIG. 2 depicts a schematic view of an optical fiber amplifier using the tellurite glass fiber in accordance with the present invention.

Referring to FIG. 2, there is a schematic view of an optical amplifier 100 using a tellurite glass in accordance with a preferred embodiment of the present invention. The optical amplifier 100 for outputting an amplified signal, comprises an optical pumping source 10, a wavelength division multiplexing (WDM) coupler 20 for coupling an input signal and a pumping light, the rare-earth doped tellurite glass 30 for amplifying the optical signal, an optical isolator 40 for transmitting the amplified signal forward and preventing backward.

The tellurite glass 30 of the present invention includes 20~70 mole % of $TeO_2$, 10~50 mole % of $GeO_2$, 1~30 mole % of $In_2O_3$, 5~30 mole % of MO, M being a material selected from the group consisting of Mg, Ca, Sr, Ba, Zn and Pb and 1~20 mole % of $R_2O$, R being a metal selected from the group consisting of Li, Na, K, Rb and Cs. Further, in the glass composition of the present invention, 3~18 mole % of the metal oxide of MO and $R_2O$ may be substituted by the metal halide. Also, 1~10 mole % of $Bi_2O_3$ may be included into the composition described above.

The tellurite glass 30 of the present invention may be fabricated by as follows: weighing the powder of raw materials; mixing them; melting at from 800 to 1,200° C.; and molding with a casting method followed by annealing at from 300 to 500° C. to obtain a required shape. The fabricated glass preform includes a cylindrical core and cladding, wherein the cladding encompasses the core. The glass preform may be drawn into an optical fiber by reheating the edge of the preform and elongating the softened preform with high speed. The tellurite glass fiber 30 may also be fabricated by a double crucible method.

Metal oxides and carbonate salts may be used for the raw materials to fabricate the tellurite glass of the present invention. The raw materials containing halogen may include metal halide, in which the metal may be selected from a group consisting of Zn, Pb, Mg, Ca, Sr, Ba, Li, Na, K, Rb and Cs, and the halogen may be selected from a group consisting of F, Cl, Br and I. The melting process is preferably performed under the atmosphere of nitrogen gas with high purity, argon gas or chlorine gas diluted with nitrogen or argon in order to prevent the contamination with $H_2O$.

Figure 1:
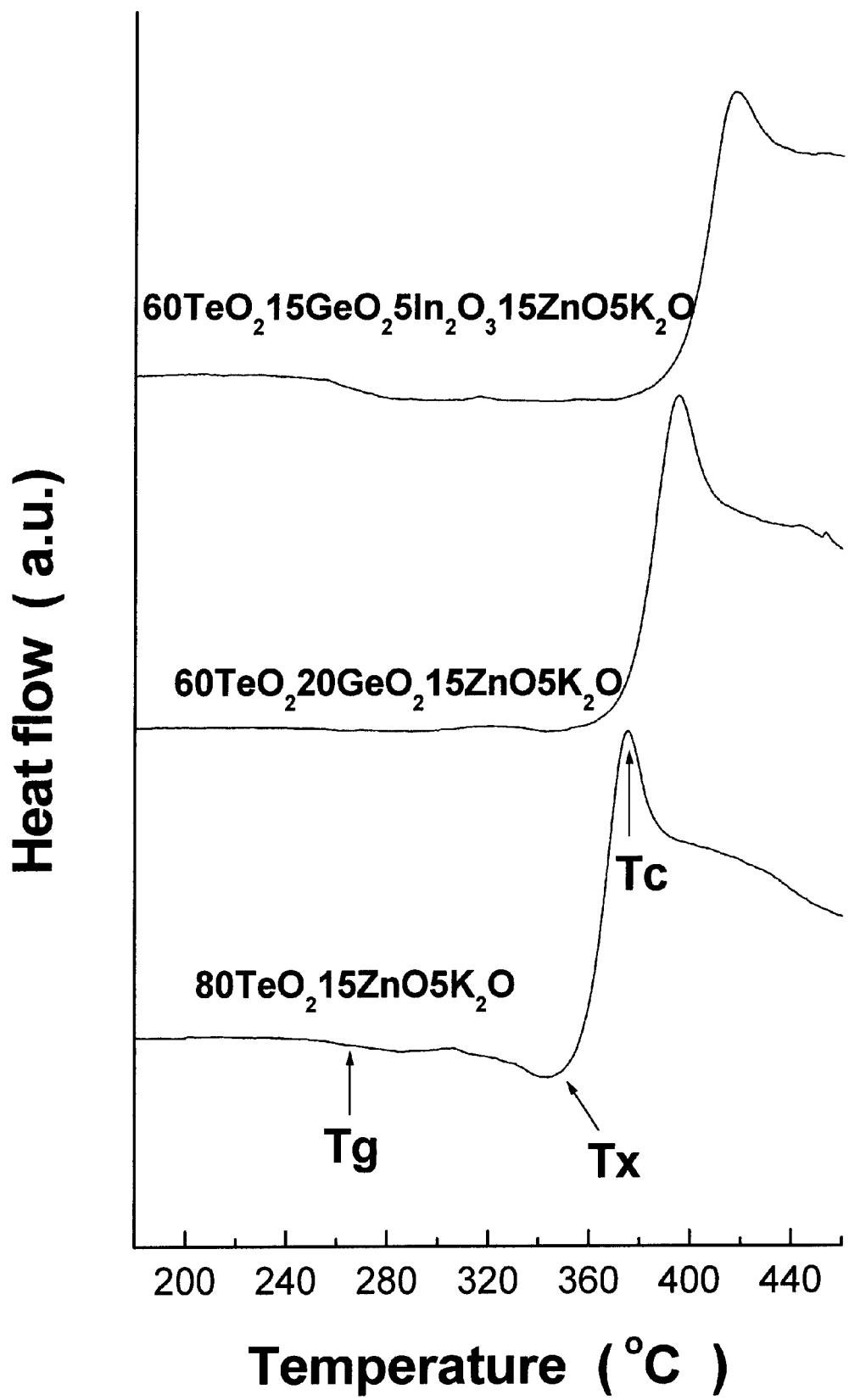
FIG. 1 shows a graph of differential scanning calorimetry analysis for 80$TeO_2$-15ZnO-5$K_2O$ glass, 60$TeO_2$-20$GeO_2$-15ZnO-5$K_2O$ glass, 60$TeO_2$-15$GeO_2$-5$In_2O_3$-15ZnO-5$K_2O$ glass.

The present invention is to suppress the crystallizations of the tellurite glasses without increasing phonon energy of the host glass and phase separation by adding a germanium oxide and an indium oxide into the conventional tellurite glasses such as $TeO_2$—MO and $TeO_2$—MO—$R_2O$ glasses as shown in FIG. 1.

A tellurium oxide ($TeO_2$) itself can not form a glass since its crystallization is very fast, but can form glass with a small amount of alkali metal oxides or alkali earth metal oxides, zinc oxides, lead oxides and the like. However, the conventional tellurite glasses such as $TeO_2$—MO and $TeO_2$—MO—$R_2O$ are easily crystallized at around the crystallization temperature that is above a glass transition temperature. All of glasses may be changed into crystals since they are in thermodynamically metastable state. However, the important thing is not the thermodynamics, but how fast the crystals are precipitated in a viewpoint of reaction kinetics. In order to fabricate the optical fiber for use in the optical amplifier and the fiber laser, it is necessary to perform the optical fiber drawing process. This process is performed by softening the cylindrical preform glass to an appropriate viscosity, e.g., $10^4 \sim 10^7$ poise, and drawing the softened preform glass. Unfortunately, many kinds of glasses have a fiberization temperature near to the crystallization temperature. The glass with a strong tendency to be crystallized makes crystals precipitated during the fiber drawing process so that the glass may include defects therein and what is worse, the fiber is cut off. The conventional tellurite glass has the strong tendency to be crystallized in comparison with the silicate glass. Therefore, fine crystals may exist within the fabricated optical fiber, which increases an optical loss too largely to be applied to optical devices such as the optical amplifier.

It is possible to suppress the crystallization of the tellurite glasses by adding germanium oxide ($GeO_2$), indium oxide ($In_2O_3$), silicon oxide ($SiO_2$) and boron oxide ($B_2O_3$). But among these, since silicon oxide and boron oxide have high phonon energy and increase the phonon energy of tellurite glass in case of adding them into the tellurite glass, they must be added with extremely small amounts. Thus, they are not effective additives. In the meantime, germanium oxide and indium oxide are suitable additives, since they have relatively low phonon energy and can effectively suppress the crystallization of the tellurite glasses in case of adding them into the tellurite glasses. For example, the maximum phonon energy of $40TeO_2$-$35GeO_2$-$25ZnO$ glass is approximately 850 $cm^{-1}$ when measured by a Raman spectroscopy. This value is near to 800 $cm^{-1}$, i.e., the maximum phonon energy of the conventional tellurite glasses such as $TeO_2$—MO and $TeO_2$—MO—$R_2O$ glasses. The maximum phonon energy of $77TeO_2$-$23In_2O_3$ glass is approximately 800 $cm^{-1}$, which is almost the same as the conventional tellurite glasses. It is thus considered that the addition of germanium oxide and indium oxide into the tellurite glasses does not increase the phonon energy. Accordingly, the rare-earth ion doped tellurite glass of the present invention does not represent the decrease of fluorescence lifetime due to a non-radiative transition through multi-phonon relaxation and has an advantage for use in gain medium of an optical fiber amplifier and laser.

The $TeO_2$ used in the glass in accordance with the present invention is a basic component for a network former of the tellurite glass and have low phonon energy. It can suppress the non-radiative transition due to multi-phonon relaxation where the energy gap between upper and lower levels is more than 3,500 $cm^{-1}$, and increase the absorption and emission cross-section in comparison with those of the silicate and the fluoride glasses. In case of adding lower amount of the $TeO_2$ than 20 mole % into the glass of the present invention, the phonon energy increases, thereby not obtaining strong fluorescence. In case of adding higher amount of the $TeO_2$ than 70 mole %, the tendency to be crystallized is increased, whereby it is difficult to fabricate the optical fiber.

The $GeO_2$ is a component for the network former of the glass, which is not high in phonon energy and can suppress the crystallization by enhancing vitrification. In case of adding lower amount of $GeO_2$ than 10 mole %, the performance for suppressing the crystallization is weak, while in case of higher amount than 50 mole %, phonon energy is increased, thereby increasing the non-radiative transition remarkably.

The $In_2O_3$ is not a component for the network former of the glass, but when added with small amount into the tellurite glass, plays an important role in suppressing the crystallization by enhancing vitrification. However, when it is added with higher amount than 30 mole %, the crystallization and the phase separation are promoted, whereby it is difficult to fabricate the optical fiber glass.

Moreover, in case of adding $GeO_2$ with $In_2O_3$ into the tellurite glass, it is preferable that the amount of $GeO_2$ is 10~30 mole % and that of $In_2O_3$ is 1~15 mole %.

MO and $R_2O$ are not components for the network former of the glass, but components for enhancing vitrification, namely for suppressing the crystallization in case of being added with small amounts. However, they may induce the crystallization in case of being added with large amounts. Therefore, it is preferable that the amount of MO is limited up to 30 mole %, and that of $R_2O$ is limited up to 20 mole %. In the present invention, M may be at least one selected from a group consisting of Mg, Ca, Sr, Ba, Zn and Pb. R may be at least one selected from a group consisting of Li, Na, K, Rb and Cs.

$Bi_2O_3$ plays an important role in further decreasing the phonon energy in the tellurite glass of the present invention. However, it is preferable that $Bi_2O_3$ should be added optionally with small amount upon the conditions of the added amounts of other components. It may induce the crystallization in case of being added with large amount. When $GeO_2$ is added with higher amount than 10 mole % in the range in accordance with the present invention, the addition of small amount of $Bi_2O_3$ cannot accelerate the crystallization. However, small amount of $Bi_2O_3$ can induce the crystallization in case of adding $GeO_2$ with lower amount than 10 mole %. $Bi_2O_3$ may be added with an amount of 0 to 10 mole %.

An optical active ion is doped into the above glass composition, which can emit near infrared fluorescence in the 1.0~3.0 μm wavelength region. The optical active ion may include rare-earth ion such as a praseodymium ion ($Pr^{3+}$), a neodymium ion ($Nd^{3+}$), a holmium ion ($Ho^{3+}$), an erbium ion ($Er^{3+}$) a thulium ion ($Tm^{3+}$), an ytterbium ion ($Yb^{3+}$) and the like. The rare-earth ion doped glass can be fabricated by mixing rare-earth metal oxide powder with other raw material powders and by melting the mixed powder. The rare-earth ion is preferably doped with at least 0.001 mole %, however, when doped with excess amount of the rare-earth ion may be agglomerate with each other, and then the fluorescence lifetime may be decreased. Thus, it is not preferable to add it with a higher amount than 10 mole %.

The present invention provides a glass for further increasing the fluorescence lifetime of the doped rare-earth ion and effectively suppressing the tendency to be crystallized, which are accomplished by substituting both or one of the MO and $R_2O$ by the metal halides. The tellurite glass has low melting point so that it is a more suitable glass to add halogen therein in comparison with other oxide glass such as silicate glass. 3 to 18 mole % of the MO and $R_2O$ may be substituted by the metal halides in the tellurite glass in accordance with the present invention. Only MO may be substituted by the metal halide, only $R_2O$ may be substituted by the metal halide, or both MO and $R_2O$ may be substituted. When the metal oxides are substituted by the metal halides within the tellurite glass, the glass transition temperature is a little decreased and the crystallization is suppressed, and the fluorescence lifetime of the doped active ion is increased.

In case that the substituted amount of metal halide is lower than 3 mole %, the effect of suppressing the crystallization and increasing the fluorescence lifetime may not be expected meaningfully. In case that the substituted amount of metal halide is higher than 18 mole %, the glass structure may be weakened to deteriorate the water resistance and the chemical durability.

When a certain transition of the rare-earth ion is used in the optical amplifier or the laser, the longer fluorescence lifetime of the upper level and the larger stimulated emission cross-section thereof provide higher efficiencies in amplification and lasing. The center wavelength of emission of $Tm^{3+}:^3H_4 \to ^3F_4$ is approximately 1,470 nm, which is a transition potentially applicable for an optical amplifier used in the 1,450~1,500 nm band. The fluorescence lifetime of $^3H_4$ level of $Tm^{3+}$ doped in the tellurite glass in accordance with the present invention, which is not substituted by the metal halide, is in the range of 200~380 μs. This value is lower than that of the fluoride glass (more 1 ms), but higher than that of the silicate glass (less 50 μs). Furthermore, in case of the oxyhalide glass in which 5~10 mole % of the metal oxide (MO or/and $R_2O$) is substituted by the metal halide, the fluorescence lifetime of $Tm^{3+}:^3H_4$ increases by 5~20% in comparison with the glass of same composition consisting of a pure oxide. It can be considered that the halogen ions are primarily arranged around the rare-earth ion to decrease the phonon energy among first neighboring ions, thus the non-radiation transition rate is decreased. It can be also considered that the intensity of localized crystal field around the rare-earth ion is decreased to increase the fluorescence lifetime fundamentally.

Figure 3:
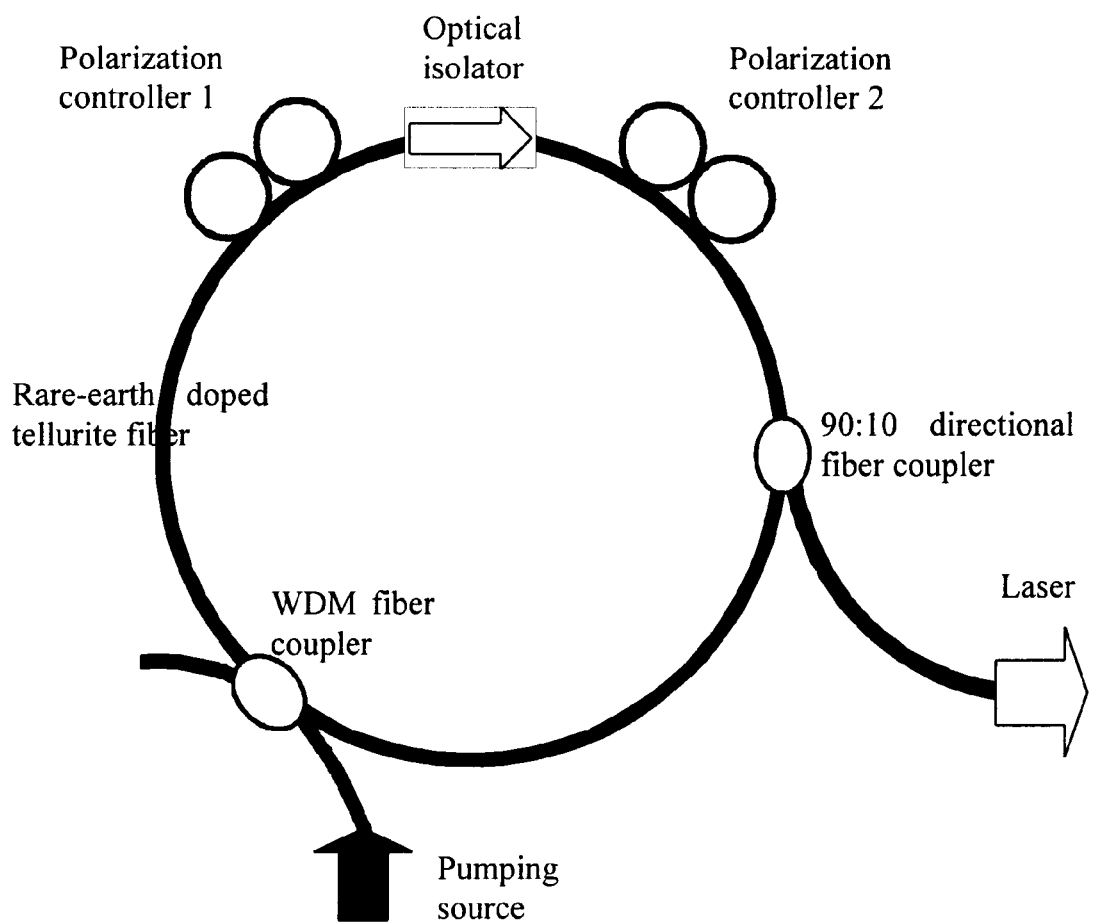
FIG. 3 illustrates a schematic view of an optical fiber laser using the tellurite glass fiber in accordance with the present invention.
Figure 4:
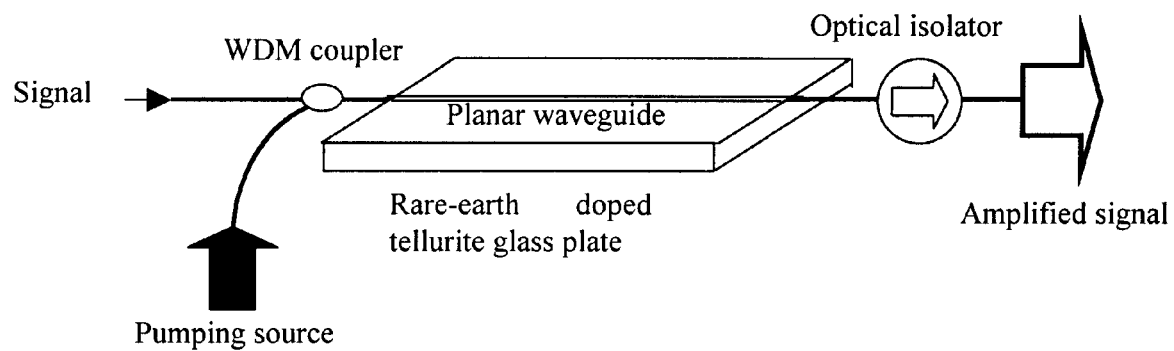
FIG. 4 presents a schematic view of a planar waveguide type optical amplifier using the tellurite glass in accordance with the present invention.

Accordingly, the tellurite glass of the present invention is used as the host glass for the optical fiber amplifier 100 as referred back to FIG. 1. Moreover, the tellurite glass of the present invention is also used for a fiber ring laser 200 and a planar waveguide type amplifier 300 as referred to FIGS. 3 and 4, respectively. It can facilitate the control of fiber fabrication processes, decrease the extrinsic optical loss, and increase the fluorescence lifetime of the doped active ion in comparison with the conventional tellurite glass. Namely, the present invention can provide the optical fiber amplifier and the laser with high efficiency.

Hereinafter, the present invention is exemplary described through the following examples. It should be considered that the examples are not to limit the scope and spirit of the present invention, but only to illustrate the present invention.

EXAMPLE 1

Tellurite glasses having compositions of glass1, glass2 and glass3 shown in Table 1 are prepared as following method. The raw material powders ($TeO_2$, $GeO_2$, $In_2O_3$, ZnO, $K_2CO_3$) with 99.9% purity were weighed and mixed. The mixture was melted in air at 950° C. for 1 hr and the melt was then poured into a casting mold made of brass at 200° C. Finally, the formed glass was annealed at 380° C. for 30 minutes.

TABLE 1

| Sample number | glass composition (in mole %) |
|---|---|
| Glass1 | 80TeO$_2$ 15ZnO 5K$_2$O 0.1Tm$_2$O$_3$ |
| Glass2 | 60TeO$_2$ 20GeO$_2$ 15ZnO 5K$_2$O 0.1Tm$_2$O$_3$ |
| Glass3 | 60TeO$_2$ 15GeO$_2$ 5In$_2$O$_3$ 15ZnO 5K$_2$O 0.1Tm$_2$O$_3$ |
| Glass4 | 60TeO$_2$ 15GeO$_2$ 5In$_2$O$_3$ 15ZnO 5K$_2$O 0.2Tm$_2$O$_3$ |
| Glass5 | 60TeO$_2$ 15GeO$_2$ 5In$_2$O$_3$ 15ZnO 5K$_2$F$_2$ 0.2Tm$_2$O$_3$ |
| Glass6 | 67TeO$_2$ 12GeO$_2$ 16ZnO 5K$_2$O 0.25Tm$_2$O$_3$ |
| Glass7 | 62TeO$_2$ 12GeO$_2$ 5Bi$_2$O$_3$ 16ZnO 5K$_2$O 0.25Tm$_2$O$_3$ |
| Glass8 | 62TeO$_2$ 12GeO$_2$ 5Bi$_2$O$_3$ 16ZnO 5K$_2$Br$_2$ 0.25Tm$_2$O$_3$ |
| Glass9 | 57TeO$_2$ 20GeO$_2$ 20ZnO 3K$_2$O 0.5Tm$_2$O$_3$ |
| Glass10 | 57TeO$_2$ 20GeO$_2$ 20ZnO 3K$_2$F$_2$ 0.5Tm$_2$O$_3$ |
| Glass11 | 57TeO$_2$ 20GeO$_2$ 20ZnO 3K$_2$Cl$_2$ 0.5Tm$_2$O$_3$ |

TABLE 1-continued

| Sample number | glass composition (in mole %) |
|---|---|
| Glass12 | 57TeO$_2$ 20GeO$_2$ 20ZnO 3K$_2$Br$_2$ 0.5Tm$_2$O$_3$ |
| Glass13 | 57TeO$_2$ 20GeO$_2$ 20ZnO 3K$_2$I$_2$ 0.5Tm$_2$O$_3$ |

The fabricated glass samples were transparent. The results of X-ray diffraction of the glass samples did not show the existences of crystals. As shown in FIG. 1, that is the DSC (differential scanning calorimeter) traces for the glass samples according to the present invention, when TeO$_2$ was substituted by GeO$_2$ and In$_2$O$_3$, T$_g$ (glass transition temperature) was hardly changed but T$_x$ (crystallization on-set temperature) and T$_c$ (crystallization peak temperature) were considerably increased. T$_x$-T$_g$ is generally used as the value estimating the thermal stability of glass. The T$_x$-T$_g$ of glass3 was increased by approximately 45° C. compared to that of glass1. This shows that the glasses of the present invention are more stable against the crystallization than the conventional tellurite glasses. Table 2 shows the fluorescence lifetime of glass1, glass2 and glass3. As shown in the table, the fluorescence lifetime of Tm$^{3+}$:$^3$H$_4$ level of the glasses in accordance with the present invention was scarcely changed by substituting with GeO$_2$ and In$_2$O$_3$.

TABLe 2

| Glass sample | Lifetime of Time$^{3+}$:$^3$H$_4$ |
|---|---|
| Glass1 | 372 μs |
| Glass2 | 330 μs |
| Glass3 | 370 μs |

EXAMPLE 2

Tellurite glass having composition of glass4 and tellurite oxyfluoride glass having composition of glass5, were prepared by the same method as described in example 1. As shown in table 3, the substitution for fluoride with amount of 5 mole % did not deteriorate the thermal stability, however, increase the fluorescence lifetime. T$_g$, T$_c$ and T$_x$ were scarcely changed with the substitution for fluoride, thus the thermal stability of oxyfluoride glass in accordance with the present invention can be regarded as similar to that of the tellurite glass consisting of the pure oxide.

TABLE 3

| Glass sample | T$_g$ | T$_x$ | T$_c$ | Lifetime of Tm$^{3+}$:$^3$H$_4$ |
|---|---|---|---|---|
| Glass4 | 268° C. | 385° C. | 417° C. | 372 μs |
| Glass5 | 265° C. | 384° C. | 416° C. | 389 μs |

EXAMPLE 3

Tellurite and oxyhalide glasses having compositions of glass6, glass7, and glass8 shown in Table 1, are prepared as following method. The raw material powders (TeO$_2$, GeO$_2$, Bi$_2$O$_3$, ZnO, K$_2$CO$_3$ and KBr) with more than 99% purity were weighed and mixed. The mixture was melted in air at 350° C. for 1 hr and the melted mixture was then poured into a casting mold made of brass at 150° C. Finally, the formed glass was annealed at 360° C. for 30 minutes. It can be seen from table 4 that the Bi$_2$O$_3$ addition to the tellurite glass in accordance with the present invention increased the fluorescence lifetime of Tm$^{3+}$:$^3$H$_4$ level and the substitution for bromide also increased the fluorescence lifetime.

TABLE 4

| Glass sample | Lifetime of Tm$^{3+}$:$^3$H$_4$ |
|---|---|
| Glass6 | 290 μs |
| Glass7 | 305 μs |
| Glass8 | 360 μs |

EXAMPLE 4

Tellurite and oxyhalide glasses having compositions of glass9, glass10, glass11, glass12 and glass13 shown in Table 1, were prepared as following method. The raw material powders (TeO$_2$, GeO$_2$, ZnO, K$_2$CO$_3$, KF, KCl, KBr and KI) with more than 99% purity were weighed and mixed. The mixture was melted in air at 900° C. for 1 hr and the melted mixture was then poured into a casting mold made of brass at 200° C. The formed glass was annealed at 370° C. for 30 minutes. The fluorescence lifetime of the oxyhalide glass in which potassium oxide substituted by potassium halide was longer than that of tellurite glass consisting of pure oxide as shown in table 5. It can be also seen that effect on the lifetime increase was the most effective in case of the substitution for fluoride.

TABLE 5

| Glass sample | Lifetime of Tm$^{3+}$:$^3$H$_4$ |
|---|---|
| Glass9 | 206 μs |
| Glass10 | 237 μs |
| Glass11 | 229 μs |
| Glass12 | 223 μs |
| Glass13 | 224 μs |

While the present invention has been described with respect to a certain preferred embodiment only, other modifications and variations may be made without departing from the spirit and scope of the present invention as set forth in the following claims.

What is claimed is:

1. A glass material suitable for a waveguide of an optical amplifier, comprising:
   20~70 mole % of TeO$_2$;
   1~30 mole % of In$_2$O$_3$;
   0.001~10 mole % of a rare earth ion dopant;
   5~30 mole % of MO, M being a material selected from a group consisting of Mg, Ca, Sr, Ba, Zn and Pb; and
   optionally 1~20 mole % of R$_2$O, R being a material selected from a group consisting of Li, Na, K, Rb and Cs.

2. The glass material as recited in claim 1, wherein the glass material further comprises 10~50 mole % of a germanium oxide (GeO$_2$).

3. The glass material as recited in claim 1, wherein the rare earth ion dopant is selected from a group consisting of a praseodymium ion (Pr$^{3+}$), a neodymium ion (Nd$^{3+}$), a holmium ion (Ho$^{3+}$), an erbium ion (Er$^{3+}$), a thulium ion (Tm$^{3+}$) and a ytterbium ion (Yb$^{3+}$).

4. The glass material as recited in claim 1, wherein the glass is in a form of an optical fiber comprising a core and cladding.

5. The glass material as recited in claim 1, wherein the glass is in a form of planar waveguide.

6. A glass material suitable for an optical waveguide amplifier, comprising:

20~70 mole % of $TeO_2$;

1~30 mole % of $In_2O_3$;

0.001~10 mole % of a rare earth ion dopant;

5~30 mole % of MO, M being a material selected from a group consisting of Mg, Ca, Sr, Ba, Zn and Pb;

optionally 1~20 mole % of $R_2O$, R being a material selected from a group consisting of Li, Na, K, Rb and Cs; and 3~18 mole % of the metal oxide of MO or/and $R_2O$ is substituted by metal halide(s).

7. The glass material as recited in claim 6, wherein the glass material further comprises 10~50 mole % of a germanium oxide ($GeO_2$).

8. The glass material as recited in claim 6, wherein the rare earth ion dopant is selected from a group consisting of a praseodymium ion ($Pr^{3+}$), a neodymium ion ($Nd^{3+}$), a holmium ion ($Ho^{3+}$), an erbium ion ($Er^{3+}$), a thulium ion ($Tm^{3+}$) and a ytterbium ion ($Yb^{3+}$).

9. The glass material as recited in claim 6, wherein the glass is in a form of an optical fiber comprising a core and cladding.

10. The glass material as recited in claim 6, wherein the glass is in a form of planar waveguide.

11. A glass material suitable for waveguide of an optical amplifier comprising:

20~70 mole % of $TeO_2$;

1~10 mole % of $In_2O_3$;

15~30 mole % of $GeO_2$;

1~10 mole % of $Bi_2O_3$;

0.001~10 mole % of a rare earth ion dopant;

5~30 mole % of MO, M being a material selected from a group consisting of Mg, Ca, Sr, Ba, Zn and Pb; and optionally 1~20 mole % of $R_2O$, R being a material selected form a group consisting of Li, Na, K,Rb and Cs.

* * * * *